Dec. 1, 1959 R. ODELL 2,914,995
SPREADER AND HITCH THEREFOR
Filed Sept. 8, 1953 3 Sheets-Sheet 3
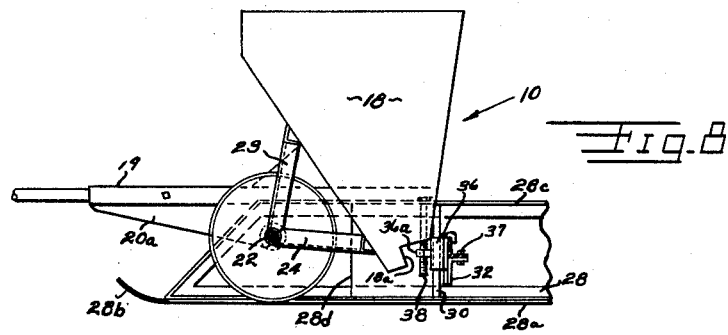
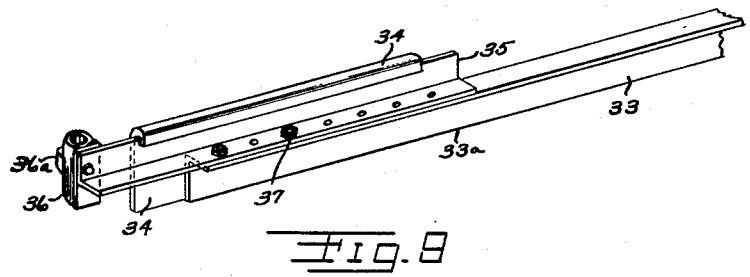
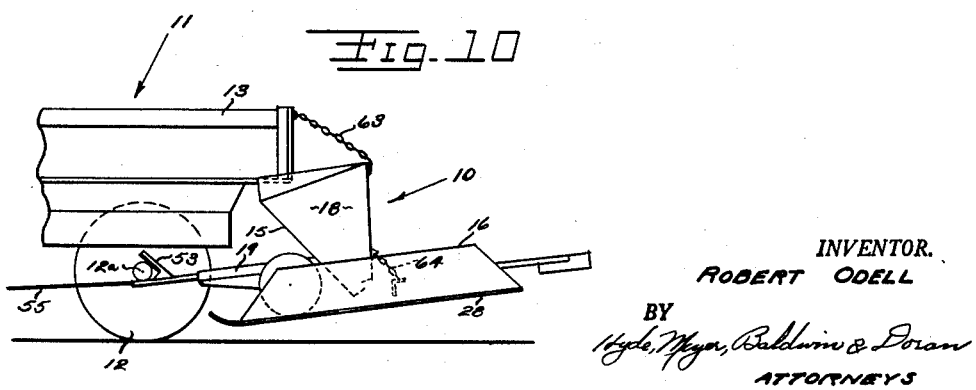
INVENTOR.
ROBERT ODELL
BY
ATTORNEYS

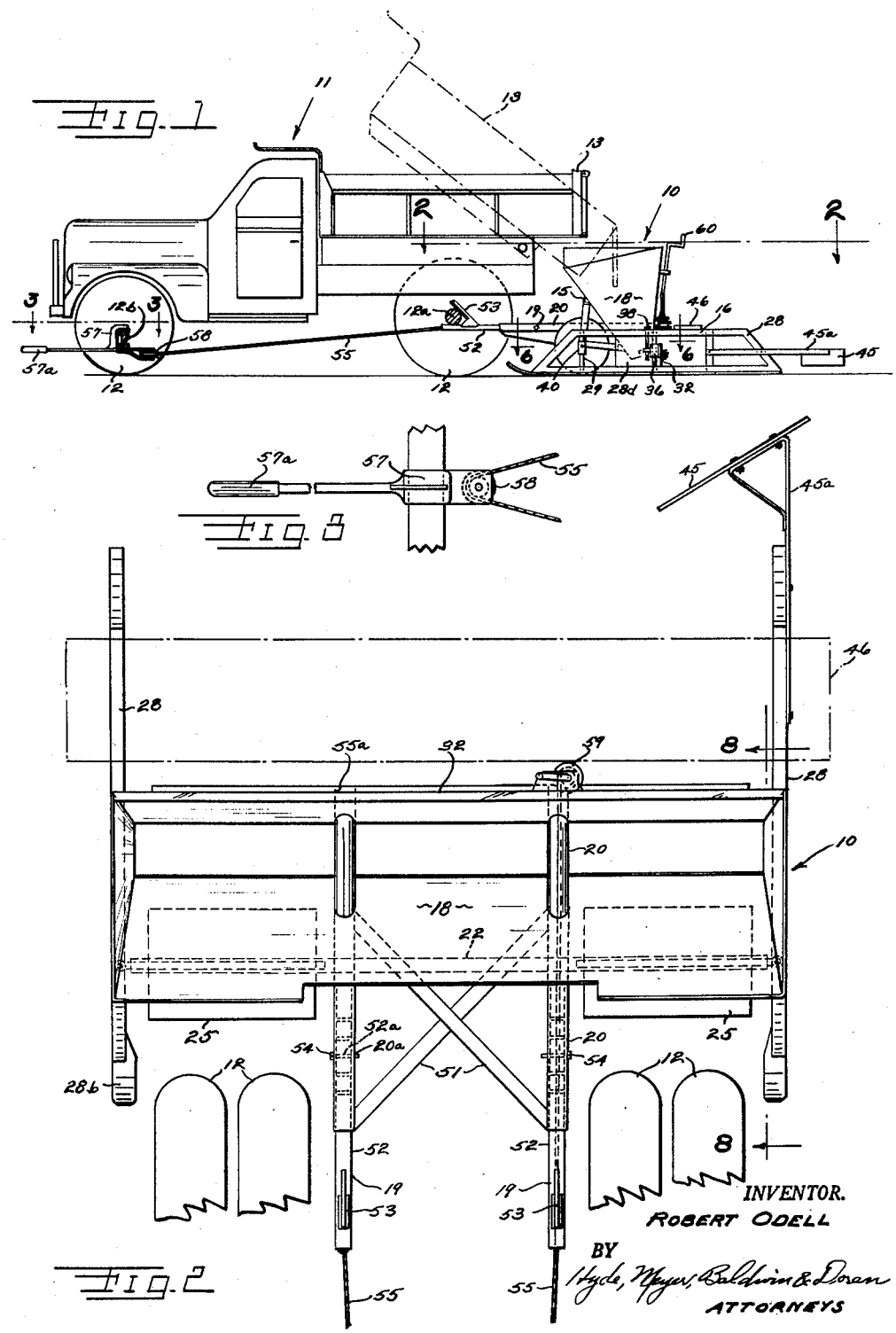

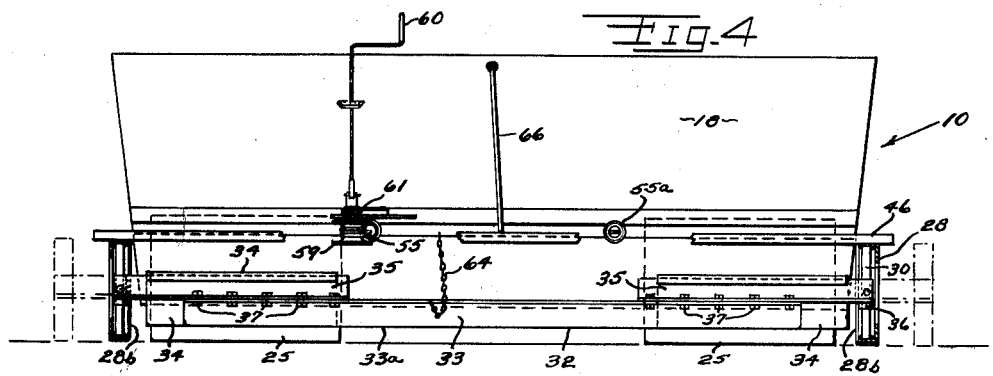
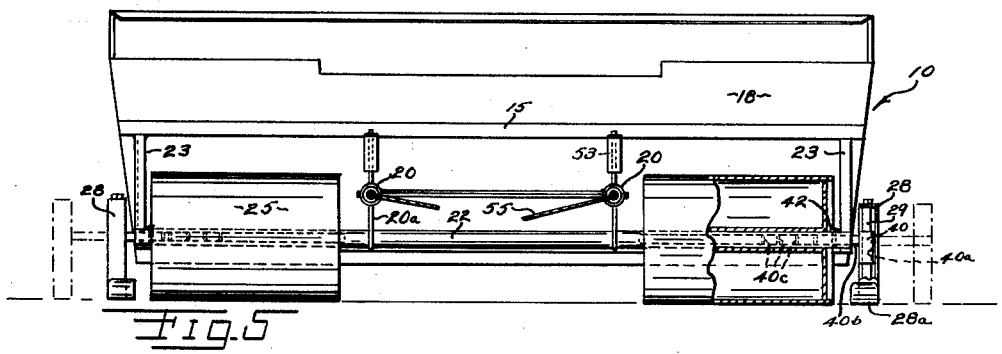
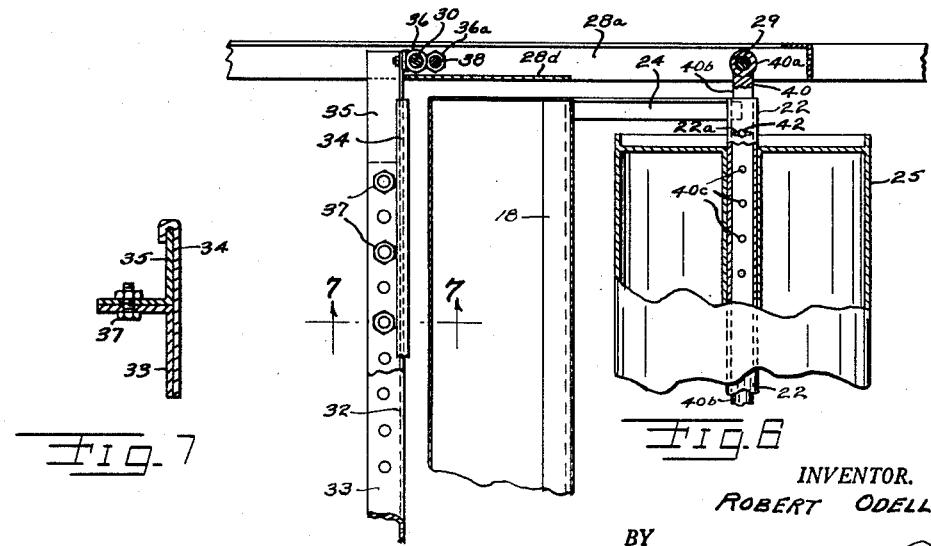

United States Patent Office 2,914,995
Patented Dec. 1, 1959

2,914,995

SPREADER AND HITCH THEREFOR

Robert Odell, Painesville, Ohio

Application September 8, 1953, Serial No. 378,834

14 Claims. (Cl. 94—46)

This invention relates to improvements in a spreader and the hitch therefor and more particularly to an asphalt spreader with a hitch connectible to a truck axle.

One of the objects of the present invention is to provide a material spreader capable of spreading a smooth, uniformly thin layer of material, with this material being preferably asphalt.

Another object of the present invention is to provide a spreader having a material smoothing means movable in response to the ground surface contour and independently of the material supply hopper.

Another object of the present invention is to provide a spreader having a material smoothing means carried by ground-engaging runners extending fore-and-aft therefrom of sufficient length so that small variations in the ground surface will not harm the smooth surface of the spread material.

Another object of the present invention is to provide a spreader having a hopper carried by ground supporting rollers in alignment with the rolling support means of the prime mover for pulling the spreader so as to smooth out any ruts caused by said means.

Another object of the present invention is to provide a spreader with a first frame having a material supply hopper and a second frame having a material smoothing means with a connection between said frames permitting free floating therebetween.

Another object of the present invention is to provide a hitch between a spreader and a supplying dump truck with said hitch having a simple structure and being easy to use.

Another object of the present invention is to provide a spreader and/or hitch characterized by structural simplicity, its strong and sturdy nature, and operating efficiency in spreading a smooth and level but uniformly thin layer of material.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 1 is a side elevational view in the material spreading position of a dump truck, spreader and hitch for connecting said spreader to the dump truck with the truck dump body shown in solid lines in its carrying position and in dot-dash lines in its dumping position;

Fig. 2 is a top plan view of the spreader and the rear wheels of the dump truck taken along the line 2—2 of Fig. 1;

Fig. 3 is a top plan view taken along the line 3—3 of Fig. 2 showing the front portion of the hitch connected to the front axle of the truck;

Fig. 4 is a rear view of the spreader with the adjustable width runners shown in contracted position by the solid lines and in laterally extended position by the dot-dash lines and with the operator's platform partially broken away for clarity;

Fig. 5 is a front view of the spreader with the roller and runner on the right-hand side thereof broken away to show details thereof;

Fig. 6 is a horizontal sectional view through the spreader taken along the line 6—6 of Fig. 1;

Fig. 7 is a vertical sectional view taken along the line 7—7 of Fig. 6 through the strikeoff plate and gate for dispensing asphalt to fill in between spread strips;

Fig. 8 is a vertical longitudinal sectional view taken along the line 8—8 of Fig. 2 facing the side of the hopper just inside one of the side rails;

Fig. 9 is an enlarged perspective rear view of one end of the strikeoff plate; while Fig. 10 is a side elevational view like Fig. 1 but showing the spreader in the elevated position for carrying.

Before the spreader and hitch here illustrated is specifically described, it is to be understood that the invention here involved is not limited to the structural details or arrangement of parts here shown since spreaders or hitches embodying the present invention may take various forms. It is also to be understood that the terminology herein employed is for purposes of description and not of limitation since the scope of the present invention is denoted by the appended claims.

Those familiar with this art will recognize that this invention may be applied in many ways. However, it has been chosen to illustrate the same as a spreader to asphalt, either cold or hot mix. But it should be realized that other materials may also be advantageously spread such as concrete, aggregate, bituminous, etc.

In Fig. 1, the spreader of this invention is generally shown at 10 in its spreading position while hitched to the back of a dump truck 11 with this dump truck having a rear dump body 13 pivotally mounted at the rear on the truck for movement between the carrying position shown in solid lines and the dumping position shown in dot-dash lines for supplying asphalt to the spreader. This truck 11 has wheels 12 serving as rolling support means mounted on rear and front axles 12a and 12b respectively with the spreader 10 hitched to these axles so that its hopper travels directly below the discharge opening of the dump body 13 at the tailgate. Of course, the spreader 10 may be pulled instead by another type of prime mover, such as a tractor, etc.

The asphalt, either hot or cold, can be spread in very thin layer, as little as $\frac{1}{32}$ inch thick, with this spreader 10. This layer is generally uniform in thickness so that even though as little asphalt as possible is used, a satisfactory asphalt spreading job results. Of course, if the ground surface has been previously scraped before laying the asphalt, so that the ground surface is level, the top surface of the spread asphalt will be level and smooth. Hence, no depressions in the top surface of the asphalt will be present for water puddles to form at a later date. Many of the advantages of the present invention are obtained by having the spreader formed by two frames with a floating connection between them, one frame 15 having the asphalt supply hopper and the other frame 16 having the smoothing means for generating the smooth top surface of the spread asphalt layer.

An inspection of Fig. 2 of the drawings will quickly reveal that generally speaking the spreader is symmetrical about its longitudinal center line (the center line is vertical in Fig. 2) and that generally each part of the spreader has a corresponding part on the opposite side of this center line with these parts being mirror images of each other and about equidistant from the center line. Therefore, only one part of each pair will be described, but it should be clearly understood that the description applies to the corresponding part on the other side of the center line.

The first frame 15 of the spreader includes a supply hopper 18 located directly below the open tailgate of the dump body 13 to receive the asphalt therefrom, as shown in Fig. 1, with this supply hopper having an open bottom for dispensing the asphalt or other material downwardly onto the ground surface to receive the asphalt layer. This frame 15 includes a hitch means with a pull yoke 19 for connecting this frame 15 in proper position below the tailgate of the dump truck. The pull yoke 19 includes two tubes 20, 20 each secured to and extending through aligned holes in the hopper 18. Each tube 20 in Fig. 2 has a depending flange 20a in Fig. 8 supporting a non-rotatable, hollow axle 22 extending horizontally and transversely across the spreader and fixed to the frame. A vertical brace 23 and a horizontal brace 24 in Figs. 5, 6 and 8 support opposite ends of the axle for greater rigidity.

The frame 15 with the supply hopper 18 can be transported over the ground surface by spaced rollers 25, 25 rotatably mounted on the hollow axle 22 for ground engagement and for rolling over previously graded earth upon which the asphalt is to be spread. Although these rollers are shown as being hollow in Figs. 5 and 6, it should be readily understood that they may be weighted by having water, sand, cement or other material in their hollow portions or may be made of solid material, if desired. It should be noted in Fig. 2 that each of the rollers is located directly behind the truck wheels 12 so that the weight of the hopper and rollers will smooth out any ruts created by the truck wheel tires so no elevated ground portions will show through when only a thin layer of asphalt has been spread. Of course, the truck 11 and its wheels 12 may take the form of any type prime mover with rolling support means, including crawler tracks, and the advantages of these strategically placed rollers will still be obtained.

The second frame 16 carries the asphalt surface smoothing means and is towed directly behind the asphalt supply hopper 18 but has a free float relative to the supply hopper frame 15 previously described. This second frame 16 has on opposite sides parallel runners 28, 28 for transporting this second frame 16 over the ground surface with movement independent of the first frame 15. Each runner in Figs. 1 and 8 is of approximately trapezoidal shape with a bottom rail 28a traveling on a previously graded ground surface and having a flat bottom serving as a ground surface engaging means. Each bottom rail 28a of the runner is located equidistant from but out of the path of the truck wheels 12, as clearly shown in Fig. 2, while the lead edge of each runner is upturned at 28b so that the spreader will smoothly travel over the ground surface not disturbed by truck wheels 12. The remainder of the trapezoidal shape has, in addition to the bottom rail 28a, a top rail 28c with these rails connected at opposite ends by upwardly converging end pieces. In each runner, the top and bottom rails are connected together in Fig. 1 by a front vertical post 29 and a rear vertical post 30.

The smoothing means carried by the second frame 16 specifically disclosed in the present application is a strikeoff blade or plate 32 extending transversely between the runners and located directly behind the asphalt supply hopper and its bottom outlet for spreading out the asphalt with a smooth top surface. However, it should be readily understood that the smoothing means may take the form of a roller, screed, gate, rake, or other device capable of performing a smoothing function. This strikeoff blade in Figs. 4, 6, 7, 8 and 9 specifically consists of a center portion 33 and adjustable end portions 34, 34. This center portion 33 as well as the adjustable end portions 34 in Fig. 9 are supported by end supports 35, 35 detachably connected to the center portion 33 by nut and bolt units 37. It should be noted that both the center portion 33 and the end supports 35 are angle irons with horizontal and vertical flanges so disposed that the horizontal flanges side against each other with the detachable bolt and nut units extending through aligned holes in these horizontal flanges to detachably connect them together.

Adjustable means is provided for securing this smoothing blade 32 to the runners for vertical adjustment to regulate the smooth material thickness. The outer end of each of the end supports 35 is pivotally connected to a tube 36 having a round cylindrical bore therethrough slidable on the cylindrical outer surface of the rear vertical post 30 in Figs. 1, 6 and 8. Each tube 36 has a projecting ear 36a in Figs. 8 and 9 threadably secured onto an adjustment screw 38 rotatably mounted in its corresponding top rail 28c but with the adjustment screw 38 fixed against endwise or vertical movement. Hence, vertical adjustment of the smoothing means is provided, and one end of the strikeoff plate 32 can even be lower than the other, if desired, since each end support 35 is pivotally connected to its associated tube 36. However, each screw 38 is loosely mounted in its top rail 28c with a limited amount of lateral movement to provide other float described more in detail hereinafter.

The bottom edge of the strikeoff blade 32 does the actual asphalt smoothing and takes the form of a lower edge 33a on the center portion 33 as well as the corresponding bottom edges on the end portions 34. This bottom asphalt engaging edge can take the form of a straight line, a parabolic curve for forming a crown in the asphalt surface, a bottom edge of any contour but with a downwardly extending projection for cutting a gutter groove along the full length of the asphalt strip, or any other desired contour.

The supply hopper frame 15 and smoothing means frame 16 are operatively connected together by a connecting means between the frame for aligning and towing the smoothing strikeoff blade 32 behind the asphalt supply hopper 18 with free float in all directions.

The strikeoff blade or plate 32 along with the frame 16 is pulled up by the supply hopper frame 15 and has vertical float with respect thereto by a connection between the runners and the transverse axle 22 on which the hopper supporting rollers are mounted. The vertical float is obtained by having on each side a T-fitting 40 with a vertically extending T-crossbar sleeve 40a at the right in Fig. 5 and in Fig. 6 telescoping over the front vertical post 29 of its associated runner 28 to tow frame 16 and to provide the vertical relative movement between the frames.

The frames 15 and 16 can also rotate with respect to each other. The stem of the T-fitting 40 takes the form of a horizontally extending post 40b having a cylindrical outer surface for telescoping within the tubular bore of the hollow axle 22 on which the supply hopper supporting rollers 25 are rotatably mounted. The hollow axle 22, non-rotatably mounted on the supply hopper frame 15, has an arcaute slot 22a therein in Fig. 6 within which a pin 42 freely rides with this pin having its shank extending downwardly through any one of a plurality of axially spaced, diametrical holes 40c in the post 40b and with its head, wider than the arcuate slot 22a, being held above the outer surface of the hollow axle 22 to retain the pin in proper position. Therefore, the frames 15 and 16 can rotate relative to each other about a horizontal, transverse axis coaxial with the hollow axle 22 within the fore-and-aft length of the runners since the tubular post 40b is free to rotate within the hollow axle 22. Arcuate slot 22a permits only the necessary, limited rotational movement needed for proper spreader operation.

The strikeoff blade or plate 32 also has a limited lateral horizontal movement. The strikeoff plate 32 and the runners 28 of the smoothing frame 16 combined with the hollow axle 22 of frame 15 resemble a rectangle. Since each of the four rectangle corners has a pivotal connection formed by the tubes 36 and sleeves 40a rotatably mounted respectively on runner posts 30 and 29, the rectangle is free to change its shape within a limited degree to any form of parallelogram.

It should now be apparent that this spreader will deposit asphalt in a very thin, uniform layer with a level top surface when deposited on a previously graded or otherwise level ground surface because of the floating connection between the independently movable frames 15 and 16 and of the other structural features of the asphalt spreader. This floating connection prevents differences in truck hitch height, the weight of the asphalt load in the supply hopper, and in slight ground irregularities from causing either a wavy surface or depressions in the top of the spread asphalt surface. The floating connection between the frames permits the smoothing frame 16 to travel independently of frame 15 and move only in response to the previously graded, smooth ground surface contour so that a uniform, thin layer of asphalt is deposited. The rise and fall of the hitch means to the truck does not effect the thickness of the layers spread. Also, since the runner rails 28a, 28a travel on the ground surface and not on the top surface of the spread asphalt, the asphalt layer is of approximately uniform thickness. Since each runner bottom rail 28a extends fore-and-aft of the strikeoff blade 32, minor ground surface variation does not materially effect the blade 32 so as to cause either a wavy surface or depressions in the top surface of the asphalt spread. The runner bottom rails 28a, 28a are sufficiently long and the strikeoff blade 32 is located midway between the front and rear ends of each runner so that the runners tend to average out any small depressions and humps in the previously graded earth surface and the strikeoff blade 32 will have a minimum of vertical and lateral disturbance.

The second frame 16 carrying the strikeoff blade 32 is also adjustable as to width since it is frequently necessary to spread a different width strip. Therefore, this smoothing frame 16 has means for adjusting its width so that the strikeoff blade 32 and the ground engaging runners 28, 28 can operate at a narrow or wide width with respect to the hopper supporting frame. The removable pins 42 in Fig. 6 at opposite ends of the roller axle 22 and the plurality of axially spaced diametrical holes 40c in the post 40b permits adjusting the front of the runners 28 to any desired width by merely telescoping the posts 40b within the hollow transverse axle 22. The rear width adjustment can be made by removing the nut and bolt units 37 in Figs. 4, 6, 7, 8 and 9 so as to adjust the strikeoff blade portions 33 and 34 with respect to each other until the desired width is achieved. Then, bolt and nut units are again inserted into aligned holes in the horizontal flanges, as in Fig. 7, to lock the strikeoff blade or plate portions together with the runners 28, 28 parallel at the desired width.

Since the asphalt is spread only behind the strikeoff blade 32 and between the runners 28, 28 and since the runners travel on the ground surface without any asphalt being spread in their path of travel, it is frequently desirable to match a layer of asphalt being spread with an adjacent strip that has been spread before with the latter having its lateral edge immediately outwardly from one of the runners 28. This is especially true when spreading hot asphalt. Hence, the newly spread strip can be matched with a previously spread strip by depositing loose material in between the strips for blending the two together.

For purposes of illustration, we will assume that this blending is required at the right side of the spreader in Fig. 2 or at the corresponding side in Fig. 4 (the left side) even though blending can be conveniently done on the opposite side. The bottom discharge opening of the asphalt supply hopper 18 has a side opening 18a in Fig. 8 so that some of the asphalt hot mix can flow laterally outwardly against the inner face of the side plates 28d in Figs. 1 and 6 carried by the runner 28 and this asphalt will flow rearwardly against the left edge of the strikeoff plate 32 in Fig. 4. The adjustable end portion 34 of the strikeoff plate acts as a material flow controller gate than can be slide laterally along the strikeoff plate to control the asphalt flow therethrough since the top of the adjustable end portion 34 in Fig. 9 is folded rearwardly over the vertical flange of the end support 35 to permit endwise movement of the adjustable portion 34 as a flow controller gate, with this gate located between the back of the hopper and the front face of the end support 35 so that the material will not tend to bend or distort the gate. As the spreader moves forwardly and a higher pile of asphalt is permitted to escape at the left edge of the adjustable gate 34, the lute or rake 45 in Fig. 2, having a straight bottom edge, is carried by an arm 45a secured to its runner and extends diagonally rearwardly and outwardly over this runner path for blending the presently laid asphalt strip with the previously laid strip by utilizing the extra asphalt material released past the partially open gate 34 since this rake 45 is located behind the gate opening and at the rear of the runner adjoining the previous strip. It should be clear that arm 45a may be made adjustable so as to move the rake 49 to any convenient vertical height, if desired.

It should be noted that the runners 28 are located laterally from the truck wheels 12 so that they travel on the previously graded ground uneffected by the rolling action of the truck wheels 12 and hopper support rollers 25. Also, the hopper support rollers 25 are aligned with and travel directly behind the truck tires 12 so as to roll out any grooves formed thereby so that no raised ground surface will show through even a thin layer of asphalt and the uniform layer of asphalt deposited will have a smooth top surface.

The top rails 28c, 28c of the runners may support a platform in the form of a wooden plank 46 in Figs. 1 and 4, if desired, so that workmen may ride on the spreader when necessary.

The spreader also includes a hitch means on the supply hopper frame 15 for detachably securing the spreader to the dump truck 11. This hitch means will not only accommodate itself to dump trucks of different types and heights but also is so designed that these differences will not effect the smooth spreading of the asphalt so that a uniformly thick asphalt layer can be spread under all conditions. Of course, this hitch means can be used for attachment between trucks and other types of trailing vehicles, and other types of hitch means could be used with this spreader, but this specific hitch means in combination with the spreader disclosed heretofore has been found to have many advantages resulting from the coaction therebetween so that a better spreading job is obtained.

The specific hitch means disclosed herein for connecting the asphalt supply hopper 18 to the dump truck 11 comprises a pull yoke 19 consisting of hollow tubes 20, 20 in Fig. 2 each secured at its rearward end to the hopper and extending through the hopper walls. Cross braces 51, 51 strengthen the pull yoke by being secured at opposite ends to one of the tubes 20 and to the supply hopper wall 18. A tube 52 is telescoped within and secured to each of the pull yoke tubes 20 in Fig. 2 and has a V-notch 53 at its leading end fitting under, behind and over the rear truck axle 12a in Figs. 1 and 10.

The supply hopper 18 is adjustable toward and away from the truck 11 so that it can be placed directly under the open tailgate of the dump body 13 on any one of a wide variety of trucks. Each tube 52 is telescoped within the fixed pull yoke tube 20 and a telescoping lock pin 54 is insertible into and removably from a hole 20a in the wall of hollow tube 20 and any one of a plurality of axially spaced diametrical holes 52a in the inner tube 52.

Each V-notch is kept securely nested on the rear truck axle 12a by a securing means. A cable or chain 55 is fixed at one end 55a in Fig. 2 behind the asphalt supply hopper in Fig. 4 by an enlargement preventing it from traveling forwardly through the pull yoke. Then, the cable extends forwardly through the hollow pull yoke tubes 20 and 52 on the left in Fig. 2, forwardly under the truck body in Fig. 1, around a pulley 58 in Fig. 3 on a front axle hook 57, and rearwardly back through the pull yoke tubes 52 and 20 on the right in Fig. 2 to a winch type cable drum 59 in Figs. 1, 2 and 4 located on the back face of the supply hopper 18 to serve as a take-up means for eliminating slack in the cables by manual rotation of the handle 60 and a conventional ratchet and pawl arrangement to prevent release of the take-up until desired.

No special attachments are needed to secure this spreader 10 to any conventional type of dump truck. After the operator decides that he wants to secure the spreader to the dump truck, he merely pays out some of the cable 55 by unwinding it from the winch cable drum 59, and pulls the cable taut with the hook 57 located directly in front of the spreader hopper 18. Then, the dump truck 11 is backed over the cable 55 until the rear axle 12a in Fig. 1 has entered the V-notches 53. Then, the operator lifts the front axle hook by its convenient extension handle 57a into securement with the front axle 12b. Rotating the winch handle 60 will eliminate the slack in the cable 55 so that the spreader is then ready for use.

This cable or chain 55 is designed with just the proper stretch so that (1) when the truck 11 is pulling the spreader 10 forwardly during spreader operation, the V-notches 53 will stay nested around the rear truck axle 12a; (2) the supply hopper frame 15 and the rear truck axle 12a can move vertically relative to each other as one or both encounter bumps or other irregularities; (3) the weight of the hopper 18 and of rollers 25 combined with the tension on cable 55 is sufficient to roll out any ruts in the ground surface caused by the truck wheels 12; and (4) the spreader 10 in Fig. 10 may be raised to its carrying position by stretching the cable 55.

This raising operation can be performed by connecting chain 63 in Fig. 10 between the back edge of the supply hopper 18 and the tailgate of the dump body 13 when the dump body is in the dumping position shown by the dot-dash line position in Fig. 1. Then, as the dump body 13 pivots to the horizontal carrying position shown in Fig. 10, the spreader will raise out of ground engagement into carrying position because the V-notches 53 act as pivots about the rear truck axle 12a and the cable 55 has sufficient stretch.

Any convenient means may be provided for connecting the first and second frames 15 and 16 together so that after the hopper 18 of the first frame 15 has begun to raise off of the ground, as shown in Fig. 10, the second frame 16 will also be raised in spite of the floating or loose connection between the frames. This takes the form in the present disclosure of a chain 64, normally slack during the spreading operation in Fig. 4 so that the frames can have free float relative to each other, but serving as a lost motion connection between the frames to lift the smoothing frame 16 as the supply hopper frame 15 is raised by the truck dump body 13 in the manner shown in Fig. 10.

The center of gravity of supply hopper frame 15 is behind the transverse axle 22; and at the time of attaching the spreader to the truck axle, the hopper may have rocked downwardly and have elevated the V-notch 53 upwardly to a position inconvenient to straddle the truck axle. To more conveniently position the V-notch, a rod 66 Fig. 4 is pivoted at its upper end to the back of the supply hopper, and may be swung manually so that its lower end engages the plank 46 on the runner frame.

The rod 66 is of chosen length and acts as a strut to hold the hopper up, and hold the V-notch down at the correct elevation for the truck axle to enter it when the truck is backed up as described. The rod 66 can thereafter be swung aside and free the hopper.

Various changes in details and arrangement of parts can be made by one skilled in the art without departing from either the spirit of this invention or the scope of the appended claims.

What I claim is:

1. A material spreader comprising a first frame including a material supply hopper and ground surface engaging support means for transporting the supply hopper over the ground surface, a second frame operatively connected for relative movement to said first frame and including a material smoothing blade located behind said hopper for spreading out said material with a smooth top surface and including ground surface engaging laterally spaced runners for transporting said smoothing blade over the ground surface so that the smooth top surface is created in response only to the smooth ground surface contour, front and rear connecting means between said runners to maintain the lateral spacing therebetween with said connecting means being spaced apart along the direction of spreader travel and four approximately vertical pivots connecting said connecting means to said runners with a pivot connecting each connecting means and each runner with the opposite connecting dimensions between corresponding pivots pairs being equal, so that said runners float and are free to assume any parallelogram shape in an approximately horizontal plane by following the path of least resistance as said runners and blade travel forwardly, said rear connecting means includes said blade and said front connecting means includes said hopper.

2. A material spreader, as set forth in claim 1, wherein said front connecting means and its pivots includes a means operatively connecting the hopper and each runner for vertical relative movement and rotational relative movement about a transverse axis between said frames.

3. A material spreader, as set forth in claim 2, wherein both said connecting means are adjustable in width between said pivots to vary said lateral spacing of the runners.

4. A material spreader comprising a first frame including a material supply hopper for depositing the material directly on the ground surface and ground surface engaging hopper support means for transporting the supply hopper over the ground surface; a second frame including a material smoothing means movable relative to said first frame located behind the outlet end of said hopper for spreading out said material with a smooth top surface as it is deposited by said hopper, and including surface engaging means for transporting said smoothing means over the surface so that the smooth top surface is created in response only to the smooth surface contour; and a connecting means between said frames for towing said smoothing means behind said hopper, said connecting means including a first means providing rotational float between said frames about a horizontal transverse axis ahead of said smoothing means within the length of said runners, and including a second means providing vertical relative movement between said frames at said axis, said ground surface engaging hopper support means taking the form of a rolling support means having an axis of rotation generally coaxial with said transverse axis.

5. A combination, as set forth in claim 4, with a prime mover pulling said spreader, said prime mover having laterally spaced rolling support means, said rolling support means of said ground surface engaging hopper support means including laterally spaced rollers operatively connected to said hopper with each roller having a cylindrical peripheral surface of substantial axial extent for hopper support with these rollers located directly behind and extending across the full width of each prime mover rolling support means to smooth any ruts created thereby, said surface engaging means of said second frame including spaced runners located out of the path of said rollers and prime mover rolling support means for guiding said smoothing means by undisturbed ground contour.

6. A combination, as set forth in claim 4, with a truck having a rear dump body pivotally mounted thereon for movement between carrying and dumping positions, hitch means connecting said spreader to said truck for towing thereby with said hopper positioned below the dump body discharge point for receiving material dumped thereby, means connectable between said first frame and dump body for lifting said first frame out of ground engagement as the dump body moves to carrying position, and a lost motion connection between said frames normally slack to provide a loose connection and float between said frames during spreading but lifting said second frame as the dump body raises said first frame.

7. A material spreader comprising a first frame including a material supply hopper and ground surface engaging hopper support means for transporting the supply hopper over the ground surface; a second frame including a material smoothing means located behind said hopper for spreading out said material with a smooth top surface, and including surface engaging means for transporting said smoothing means over the surface so that the smooth top surface is created in response only to the smooth surface contour; and a connecting means between said frames for towing said smoothing means behind said hopper with float in a generally vertical transverse plane and with pivotal float about a horizontal transverse axis in said plane, one of said frame members including a generally vertical post and the other of said frame members including a horizontally and transversely extending element with a cylindrical surface coaxial with said axis, said connecting means including a member having a sleeve portion and having a connector portion with a cylindrical surface, said sleeve portion being telescoped over said post and said cylindrical surfaces being telescoped together to provide said vertical and pivotal floats.

8. A material spreader comprising a first frame including a material supply hopper and ground surface engaging hopper support means for transporting the supply hopper over the ground surface; a second frame including a material smoothing means located behind said hopper for spreading out said material with a smooth top surface, and including surface engaging laterally spaced runners for transporting said smoothing means over the surface so that the smooth top surface is created in response only to the smooth surface contour; and a connecting means between said frames for towing said smoothing means behind said hopper with rotational float between said frames and for adjusting the lateral distance between said runners at one location along their direction of travel, said first frame including a horizontally and transversely extending element with a cylindrical surface, said connecting means including a member having one portion operatively connected to one of said runners and a second portion having a cylindrical surface telescoped with the cylindrical surface of said element to provide said rotational float, said connecting means including a rotational lost motion connection operatively connecting said cylindrical surfaces to provide said rotational float and having a plurality of different axially displaced engagement positions of said cylindrical surfaces with each resisting axial relative movement between said cylindrical surfaces for adjusting and maintaining the distance between said runners.

9. A material spreader comprising a first frame including a material supply hopper and ground surface engaging hopper support means for transporting the supply hopper over the ground surface; a second frame including a material smoothing means located behind said hopper for spreading out said material with a smooth top surface, and including surface engaging laterally spaced runners for transporting said smoothing means over the surface so that the smooth top surface is created in response only to the smooth surface contour; and a connecting means between said frames for towing said smoothing means behind said hopper with float in a generally vertical transverse plane and with pivotal float about a horizontal transverse axis in said plane and for adjusting the lateral distance between said runners at one location along their direction of travel, said second frame member including a generally vertical post on each runner, said first frame member including laterally spaced horizontally and transversely extending element portions with coaxial cylindrical bore and peripheral surfaces, said connecting means including two T-shaped members each having a sleeve portion as the T-cross bar and the T-stem portion having a cylindrical peripheral surface with a sleeve portion telescoped over each of said posts and with said cylindrical surfaces telescoped together to provide said generally vertical and pivotal floats, said connecting means including a rotational lost motion connection operatively connecting said cylindrical surfaces to provide said rotational float and having a plurality of different axially displaced engagement positions of said cylindrical surfaces with each resisting axial relative movement between said cylindrical surfaces for adjusting and maintaining the distance between said runners, said ground surface engaging hopper support means taking the form of a rolling support means rotatably mounted on the peripheral surface of said element portions so that said axis of rotation is coaxial with said transverse axis, pivot means pivotally connecting said smoothing means at each end to its associated runner for pivotal movement about a generally vertical axis, the horizontal dimensions between said pivot means and between said posts being equal and the horizontal dimensions between the pivot means and post on one runner being equal to that on the other runner so that opposite corresponding dimensions between corresponding pivot pairs are equal and so that said runners float and are free to assume any parallelogram shape in an approximately horizontal plane.

10. A spreader adapted to be pulled by a prime mover having a rear axle, said spreader including a hopper and a material smoothing means located behind and pulled by said hopper but being movable relative thereto, ground engaging means operatively connected to said smoothing means for support thereof behind said hopper, a hitch means for connecting said hopper and prime mover comprising a pull yoke secured at its trailing end to said hopper and having means spaced forwardly therefrom for securement at its leading end to the rear axle, a ground engaging rolling support means rotatably connected on the lead side of the center of gravity of said hopper and hitch means, and removable support means responsive to engagement with the hopper and material smoothing means for tilting said hopper upwardly on the center of gravity side of said rolling support means so that the hitch means will be properly aligned with the axle when securing together the spreader and prime mover with said removable support means including a rod pivotally mounted to the hopper for swinging into abutting engaging relationship with said material smoothing means by a camming action for supporting said hopper thereon in a supported position spaced from said ground or into disengaging relationship free of said smoothing means and wherein said hopper may approach the ground closer than in said supported position.

11. A material spreader comprising a first frame including a material supply hopper means and ground surface engaging hopper support means for transporting the supply hopper means over the ground surface; a second frame including a material smoothing means located behind said hopper means for spreading out said material with a smooth top surface, and including laterally spaced surface engaging means for transporting said smoothing means over the surface so that the smooth top surface is created in response only to the smooth surface contour, said second frame having front and rear adjustable connection means for adjusting the width between said laterally spaced surface engaging means and forming a rigid connection for the lateral spacing therebetween with said smoothing means being adjustable in width and forming one of said adjustable connection means, said front connection means being secured by a first pair of laterally spaced pivots and said rear connection means being secured by a pivot means including a second pair of laterally spaced pivots to said laterally spaced surface engaging means so that relative movement between at least a portion of one of said connection means and said last mentioned surface engaging means about an upwardly extending axis is provided by each pivot; a connecting means between said frames for towing said smoothing means behind said hopper means with float, said connecting means including one pair of said pivots and including means operatively connecting said frames for relative movement between said frames with respect to an axis lying in a plane extending transverse to the direction of spreader travel; and joining means connecting said smoothing means at laterally spaced locations to said laterally spaced surface engaging means, said joining means including at each location a coacting screw element and nut element having an upwardly extending screw axis, each of said locations having an element connecting means connecting one of said elements to said smoothing means and an element connecting means connecting the other of said elements to one of said laterally spaced surface engaging means, at least one of said element connecting means being constructed so that its element is rotatable about its associated screw axis for vertically adjusting and smoothing means relative to said laterally spaced surface engaging means along the axis of the pivot pair of said adjustable connection means having said smoothing means.

12. A material spreader comprising a first frame including a material supply hopper and ground surface engaging support means for transporting the supply hopper over the ground surface, a second frame operatively connected for relative movement to said first frame and including a material smoothing blade located behind said hopper for spreading out said material with a smooth top surface and including ground surface engaging laterally spaced runners for transporting said smoothing blade over the ground surface so that the smooth top surface is created in response only to the smooth ground surface contour, front and rear connecting means between said runners to maintain the lateral spacing therebetween with said connecting means being spaced apart along the direction of spreader travel and four approximately vertical pivots connecting said connecting means to said runners with a pivot connecting each connecting means and each runner with the opposite connecting dimensions between corresponding pivots pairs being equal, so that said runners float in an approximately horizontal plane and are free to assume any parallelogram shape in said approximately horizontal plane by following the path of least resistance as said runners and blade travel forwardly.

13. A combination, as set forth in claim 12, with a prime mover pulling said spreader, said prime mover having laterally spaced rolling support means, said ground surface engaging hopper support means including laterally spaced rollers operatively connected to said hopper with each roller having a cylindrical peripheral surface of substantial axial extent for hopper support with these rollers located directly behind and extending across the full width of each prime mover rolling support means to smooth any ruts created thereby, said spaced runners being located out of the path of said rollers and prime mover rolling support means for guiding said smoothing blade by undisturbed ground contour.

14. A combination, as set forth in claim 12, with a truck having a rear dump body pivotally mounted thereon for movement between carrying and dumping positions, hitch means connecting said spreader to said truck for towing thereby with said hopper positioned below the dump body discharge point for receiving material dumped thereby, means connectable between said first frame and dump body for lifting said first frame out of ground engagement as the dump body moves to carrying position, and a lost motion connection between said frames normally slack to provide a loose connection and float between said frames during spreading but lifting said second frame as the dump body raises said first frame.

References Cited in the file of this patent

UNITED STATES PATENTS

| | | |
|---|---|---|
| 1,457,928 | Johnson | June 5, 1923 |
| 1,744,613 | Coulter | Jan. 21, 1930 |
| 1,767,243 | Kime | June 24, 1930 |
| 1,817,161 | Mosel et al. | Aug. 4, 1931 |
| 1,994,437 | Reis | Mar. 12, 1935 |
| 2,054,436 | Mosel | Sept. 15, 1936 |
| 2,054,437 | Mosel | Sept. 15, 1936 |
| 2,169,987 | Mosel | Aug. 15, 1939 |
| 2,303,486 | McConnaughay | Dec. 1, 1942 |
| 2,332,687 | Baily | Oct. 26, 1943 |
| 2,403,820 | Miller | July 9, 1946 |
| 2,500,064 | Foster | Mar. 7, 1950 |